Figure 1:
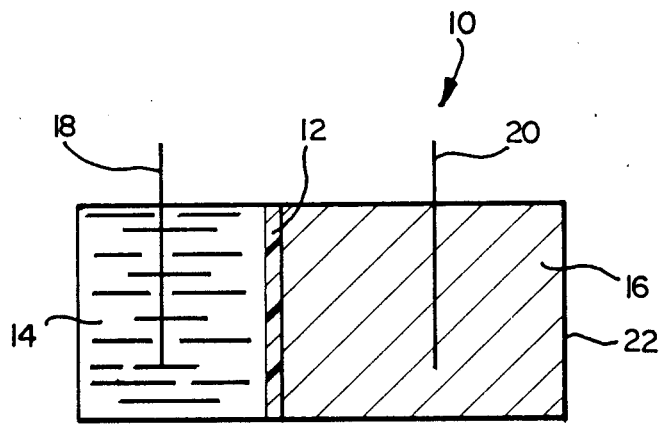

United States Patent [19]

Adendorff et al.

[11] Patent Number: 4,973,534
[45] Date of Patent: Nov. 27, 1990

[54] ELECTROCHEMICAL CELL

[75] Inventors: Keith Adendorff, Springs, South Africa; Roy C. Galloway, Quarndon, England; Walter G. Bugden, Nottingham, England; Anthony A. Meintjes, Pretoria, South Africa

[73] Assignee: Lilliwyte Societe Anonyme, Luxembourg

[21] Appl. No.: 447,502

[22] Filed: Dec. 7, 1989

[51] Int. Cl.$^5$ .................. H01M 4/38; H01M 10/39
[52] U.S. Cl. .................... 429/103; 429/104; 429/223; 29/623.1
[58] Field of Search .................. 429/103, 104, 223; 204/2.1; 29/623.1

[56] References Cited

U.S. PATENT DOCUMENTS

| 4,288,506 | 9/1981  | Coetzer et al. | 429/199 |
| 4,546,055 | 10/1985 | Coetzer et al. | 429/103 |
| 4,592,969 | 6/1986  | Coetzer et al. | 429/50  |
| 4,626,483 | 12/1986 | Bones et al.   | 429/50  |
| 4,722,875 | 2/1988  | Wright         | 429/103 |
| 4,795,685 | 1/1989  | Bones et al.   | 429/104 |

FOREIGN PATENT DOCUMENTS 2219430 12/1988 United Kingdom .

OTHER PUBLICATIONS

Abraham et al., Rechargeable Sodium Batteries—VI. Cycling Behavior or VS$_2$, 'VCl$_3$+nS' and NbS$_2$Cl$_2$ Cathodes in Molten NaAlCl$_4$, May 20, 1985.

Primary Examiner—Donald L. Walton
Attorney, Agent, or Firm—Arnold, White & Durkee

[57] ABSTRACT

The invention provides a cathode for an electrochemical cell, a cell incorporating the cathode, and a method of rendering the cathode resistant to a drop in capacity associated with cell cycling. The invention involves dispersing a transition metal, other than Ni, Fe, Cr, Co or Mn, in the active cathode substance, the cathode comprising an electronically conductive porous matrix impregnated with sodium aluminium halide molten salt electrolyte containing chloride ions. Said active cathode substance is an chlorinated nickel-containing substance dispersed in the matrix.

11 Claims, 4 Drawing Sheets

ELECTROCHEMICAL CELL

This invention relates, broadly, to electrochemical cells. More particularly, it relates to a cathode for a high temperature electrochemical cell; to a high temperature electrochemical cell including such cathode separated by a separator from an anode; and to a method of rendering a cathode resistant to a progressive drop in the capacity associated with repeated charge/discharge cycling thereof.

According to one aspect of the invention there is provided a cathode for a high temperature rechargeable electrochemical cell which comprises an electronically conductive electrolyte-permeable macroscopically porous matrix impregnated with a sodium aluminum halide molten salt liquid electrolyte which contains chloride ions and is molten at the operating temperature of the cathode, the matrix having a chlorinated nickel-containing substance dispersed therein as its active cathode substance, a suitable dopant which is a transition metal other than Ni, Fe, Cr, Co or Mn being dispersed as a dopant in said active cathode substance, in a proportion of 0,1 − 10% by mass of the electronichemically active nickel in the cathode, for resisting a progressive drop in the capacity of the cathode with repeated charge/discharge cycling thereof.

By 'suitable' is meant that, at the operating temperature of the cathode, the transition metal dopant should not react chemically detrimentally with the molten salt electrolyte; and it should be compatible with and should not react chemically detrimentally, in a cell in which the cathode is used, with any separator intended to separate the cathode from an anode. Suitable transition metal dopants include vanadium [V], molybdenum [Mo], tungsten [W], platinum [Pt], palladium [Pd] and possibly niobium [Nb].

Certain of the dopants in question will be chlorinated during charging at voltages below the open circuit voltage of the Ni/NiCl$_2$ cathode, while others will not chlorinated during charging. Thus, for example, when V is used it can be electronically active in the cathode, as tests conducted by the Applicant have shown that VCl$_2$ and VCl$_3$ form respectively during charging of cathodes according to the invention at 1,8V and 2,3V, both below the open circuit voltage of 2,6V of the Ni/NiCl$_2$ cathode. On the other hand MoCl$_2$ forms at about 3,1V and WCl$_2$ at about 2,8V, so that Mo and W, and indeed Pt, Pd and Nb are electrochemically inactive in the cathode. However, even if the transition metal dopant is active, any contribution thereby to cathode capacity will be neglected, as the function of the dopant is reduction of Ni/NiCl$_2$ cathode capacity loss, and it is used in negligibly small proportions from the point of view of capacity.

Accordingly suitable dopants include those which do not become chlorinated during cathode charging, and those, such as V, which form stable high melting point chlorides, the NaCl/VCl$_2$ and NaCl/VCl$_3$ eutectics respectively having melting points of about 680° C. and about 450° C., both safely above the usual cathode operating temperatures of 280°-300° C.

Low eutectic melting points can result in dissolution of the chlorinated dopants in the liquid electrolyte and leaching thereof from the active cathode substance, which destroys their utility. Furthermore dopants dissolved in the liquid electrolyte can poison any solid electrolyte separator such as $\beta$- or $\beta''$-alumina, which may be used in a cell to separate the cathode from a sodium anode; and low melting points are typically associated with high vapour pressures at cathode operating temperatures which are undesirable as they can damage said separators and cause cell sealing problems.

It follows that any chloride of the dopant transition metal which forms during charging of the cathode preferably has a eutectic with NaCl which has a melting point of at least 300° C., more preferably at least 350° C. In particular, the dopant may be selected from the group of transition metals consisting of vanadium, molybdenum, tungsten, platinum and palladium, and may be present in a proportion of 1-5% by mass of said electrochemically active nickel.

The active cathode substance may include NiCl$_2$ itself, one or more compounds of nickel which have been chlorinated, or combinations of the aforegoing. Instead, the matrix may comprise a material which does not contain nickel; and the active cathode substance may comprise an intermediate refractory hard metal compound of nickel, such as a carbide, nitride, phosphide, boride or silicide thereof, which has been activated by chlorination. The nickel which is chlorinated to form the active cathode substance, may be alloyed with a minor molar proportion of at least one member of the group comprising iron, chromium, cobalt and manganese, and these alloys or nickel itself when used alone may contain minor molar proportions of at least one member of the group comprising phosphorous, boron, silicon, nitrogen and carbon.

Accordingly, the active cathode substance may be selected from the group of chlorinated nickel-containing substances consisting of:

NiCl$_2$;

chlorides of alloys containing a major proportion of nickel on a molar basis alloyed with a minor molar proportion of at least one metal selected from the group consisting of iron, chromium, cobalt, manganese and mixtures thereof;

intermediate refractory hard metal compounds of nickel and at least one non-metal selected from the group consisting of carbon, nitrogen, phosphorous, boron and silicon; and mixtures of at least two of the aforegoing.

In a particular embodiment of the invention, the active cathode substance may be the NiCl$_2$, the matrix being nickel.

As indicated above, nickel-containing active cathode substance may contain, based on the active nickel therein, 0,1-10% by mass of the transition metal dopant, preferably 1-5%. It is to be emphasized that the proportions of transition metal dopant specified are based on the amount of electrochemically active Ni in the cathode, ie the Ni which is chlorinated during charging or which forms part of a compound, alloy or substance which is chlorinated during charging. In determining the proportion of dopant, electrochemically inactive nickel, eg such as that which may be used for a nickel cathode current collector and which is not chlorinated to any significant extent during charging, is ignored.

While V, Mo, W, Pd and Pt are preferred as transition metal dopants by the Applicant as they have been tested successfully and have acceptably low vapour pressures and exhibit no unacceptable chemical reactions with the electrolyte or cell separators used in the cell environment, the Applicant believes that from chemical and electrochemical considerations, Ti, Sn, and Pb are not considered to be promising, by virtue of their unsuitably low melting points and/or unsuitably high vapour pressures.

According to another aspect of the invention there is provided a high temperature rechargeable electrochemical cell which comprises a cathode as described above, a sodium anode which is liquid at the operating temperature of the cell, a sodium aluminum halide molten salt liquid electrolyte in contact with the exterior of the cathode and having the same composition as the liquid electrolyte impregnated into the matrix of the cathode, and, between the anode and the electrolyte and separating the anode from the electrolyte, a separator which is a solid conductor of sodium ions or a micromolecular sieve which contains sodium sorbed therein.

By 'separating' is meant that any ionic sodium or metallic sodium moving from the anode to the electrolyte or vice versa has to pass through the internal structure of the solid conductor or through the microporous interior of the sieve, as the case may be, said anode and electrolyte in use being molten and being in contact with opposite sides of the separator.

Further according to the invention, in the manufacture of a cathode comprising an electronically conductive electrolyte-permeable, macroscopically porous matrix impregnated with a sodium aluminum halide molten salt liquid electrolyte which contains chloride ions and is molten at the operating temperature of the cathode, the matrix having a chlorinated nickel-containing substance dispersed therein as its active cathode substance, there is provided a method of rendering the cathode resistant to a progressive drop in the capacity thereof associated with repeated charge/discharge cycling thereof, the method comprising doping of the active cathode substance with a suitable transition metal dopant other than Ni, Fe, Cr, Co or Mn, so that the dopant is dispersed therein and is present in a proportion of 0,1–10% by mass of the electrochemically active nickel in the cathode.

The dopant, which will be added as a solid, is preferably in extremely finely divided form, eg having an average particle size of at most 10 microns. While the dopant transition metal will usually be added to the cathode as the transition metal itself or a chloride thereof, it can be added as any compound or salt of the transition metal which will be reduced to the transition metal in the cathode, chemically or electrochemically during the first charge cycle. Thus the chalcogenides such as the oxides, sulphides or selenides of the dopant metal can be used as dopants. This doping will lead to the presence in the cathode of transition metal in question, and the reaction products of its reduction such as oxygen, sulphur and selenium. Naturally, the dopant, when a compound or salt, should be selected so that it is chemically and electrochemically compatible with the cathode environment, and has reduction reaction products such as those of the chlorides or oxides which are harmless in the cathode, or indeed such as those of the sulphides and selenides which can be beneficial.

The electrolyte is conveniently a sodium aluminum chloride molten salt electrolyte, which can, depending on the proportions of sodium and aluminum therein, have a melting point of the order of 150° C. or less, and wherein, also depending on its composition, the active cathode substance can be virtually insoluble. This electrolyte may contain a minor proportion of up to, say, 20% by mass but usually less, of an alkali metal halide other than sodium chloride. This halide may comprise an alkali metal fluoride. The proportions of the constituents of the electrolyte should however be selected such that the solubility of the active cathode substance in the electrolyte is kept to a minimum.

The applicant has found that the minimum solubility of the active cathode substance in the sodium aluminum chloride electrolyte [which may contain another alkali metal halide as described above], occurs when the molar ratio of the alkali metal halide to the aluminum halide is about 1:1, so that the relative quantities of said alkali metal ions, aluminum ions and halide ions conform substantially with the stoichiometric product:

$$MAlX_4$$

wherein:

M represents alkali metal cations; and

X represents halide ions.

This is 1:1 molar ratio can easily be maintained during all states of charge by ensuring that, when the cathode is fully charged, there is at least some solid NaCl in contact with the liquid electrolyte.

Minor proportions of other metal halide dopants, other than transition metal halides may be tolerated in the electrolyte, eg substances which will ionize in the molten electrolyte to provide ions which affect the electrolytic action of the electrolyte, but their nature and quantity should be insufficient to alter the essential character of the electrolyte as a sodium aluminum chloride electrolyte, where in the $MAlX_4$ product is maintained.

When the cell contains a solid conductor of sodium ions, said solid conductor may be beta-alumina, eg beta''-alumina, or nasicon, and in this case sodium should be the only alkali metal present in the liquid electrolyte.

Instead, when the cell contains an micromolecular sieve carrier, this carrier can be regarded as a conductor of sodium metal and/or sodium ions, depending on the mechanism whereby sodium is transported therethrough.

By 'micromolecular sieve' is meant a molecular sieve having interconnected cavities and/or channels in its interior and windows and/or pores in its surface leading to said cavities and channels, the windows, pores, cavities and/or channels having a size of not more than 50 Angstrom and preferably less than 20 Angstroms. These pore sizes are to be contrasted with those of the macroporous matrix of the cathode, which are larger by at least two orders of magnitude, typically by three or four orders of magnitude.

Suitable micromolecular sieves are mineral micromolecular sieves, ie inorganic lattice or framework structures such as tectosilicates, eg the zeolites 13X, 3A, 4A or the like, although certain essentially organic micromolecular sieves such as clatherates may, in certain circumstances, be suitable.

The cathode substance should preferably be evenly dispersed throughout the matrix; and it may be in finely divided particulate form and/or it may adhere as small particles or a thin layer to the matrix, preferably so that there are no large particles or thick layers of active cathode substance present, and preferably so that none of the active cathode substance is spaced physically from the material of the matrix, which acts as a current collector, by an excessive spacing, eg in large cavities in the matrix. In other words, the active cathode substance should be as close as possible to or adherent to the material of the matrix, and should be as thinly spread as possible, consistent with the porosity of the matrix and the quantity of the cathode substance required to the present. Large particles or thick layers of active cathode substance will not prevent the cell from working, but will merely be inefficient, a proportion of the active cathode substance remote from the matrix material amounting merely to dead weight.

The cathode of the present invention can be made by forming an electronically conductive electrolyte-permeable matrix, impregnating its porous interior with electrolyte and dispersing active cathode substance in its interior, eg by forming a porous nickel matrix and impregnating it with liquid electrolyte containing finely divided NaCl suspended therein to form a cathode in its discharged state, in which case the matrix can be preformed by sintering nickel powder under a reducing atmosphere. Instead, the NaCl can be mixed in finely divided powder form with the nickel powder before sintering, followed by impregnating with the liquid electrolyte. In either case the dopant can be added in finely divided form to the nickel powder before the sintering.

Alternatively, the cathode can be made by forming a powder mix of nickel, NaCl and dopant, and impregnating the powder mix with liquid electrolyte, the matrix being formed electrochemically from the impregnated powder mix by charge/discharge cycling in a cell with a sodium anode.

When the liquid electrolyte is impregnated into a matrix, dopant can instead or in addition be introduced into the matrix in finely divided form suspended in the electrolyte.

Thus, broadly in accordance with the method of the invention, the matrix may be formed from a powder mix containing the active cathode substance or a precursor thereof in powder form, the method comprising dispersing the transition metal dopant or a suitable compound thereof in finely divided powder form having an average particle size of at most 10 microns in the powder mix prior to formation of the matrix, so that formation of the matrix from the powder mix results in a matrix in which the active cathode substance is dispersed, and in which the dopant is dispersed in the active cathode substance; and, instead or in addition, when the liquid electrolyte is impregnated into the matrix after formation of the matrix, the dopant may be dispersed in the active cathode substance by dispersing the dopant transition metal or a suitable compound thereof in finely divided powder form having an average particle size of at most 10 microns in the liquid electrolyte prior to impregnation of the electrolyte into the matrix, whereby the dopant transition metal becomes incorporated in dispersed form in the active cathode substance during subsequent charge/discharge cycling of the cathode.

A convenient way of making the cathode of the present invention, is thus by sintering, under reducing atmosphere such as a $H_2$, suitable powder mix of the transition metal dopant together with Ni and NaCl, the powder mix being conveniently compacted around a nickel current collector, such as a nickel gauze. This produces a porous nickel metal matrix in electronic contact with the nickel current collector, and containing the dopant and NaCl, which NaCl is a reaction product produced by discharge of cathodes in accordance with the present invention. This porous matrix can then be impregnated with the liquid electrolyte, optionally containing finely divided dopant dispersed herein as described above, to produce what is, electrochemically, the cathode of the present invention in its discharged state.

Impregnation of the matrix may be with an $NaAlCl_4$ liquid electrolyte, in which the molar proportions of $AlCl_3$ and NaCl are preferably 1:1 as described above, with a transition metal dopant optionally introduced into the cathode as a finely divided powder dispersed in the molten liquid electrolyte before it is impregnated into the matrix. Similarly, the liquid electrolyte in a cell according to the invention which is outside the matrix, in contact with the cathode and between the cathode and the separator may have the same proportion or concentration of finely divided transition metal dopant sulphide or selenide dispersed therein.

The invention will now be described in more detail, with reference to the following non-limiting illustrative Examples and to the accompanying drawings, in which:

FIG. 1 shows a schematic illustrative drawing of a cell in accordance with the invention; and FIGS. 2 to 6 show graphical plots of various operating characteristics of the cells described in the Examples.

EXAMPLE 1

Four cells were prepared namely a control and three cells in accordance with the present invention. In each case 116g nickel powder [Inco Ni grade 255 nickel available from International Nickel Company Limited] of 2-5 micron particle size was uniformly mixed with 80g NaCl of 53 micron particle size. The mixture was in each case poured into a porous mould containing a central nickel gauze current collector and sintered under a hydrogen reducing atmosphere for 30 minutes at 790° C., to produce a sintered porous nickel matrix which was then vacuum impregnated with molten $NaAlCl_4$ which was an equimolar mix of NaCl and $AlCl_3$.

The artifacts so formed amounted electrochemically to cathodes in their discharged state and were assembled as cathodes into test cells having molten Na anodes, molten $NaAlCl_4$ [equimolar NaCl and $AlCl_3$] liquid electrolytes and beta"-alumina solid electrolyte separators which separated the anodes from the liquid electrolyte in each case.

The control cell, not in accordance with the invention, had no dopant in its cathode. One cell had V powder of 5-10 micron average particle size added to the Ni/NaCl powder before sintering; one cell had Mo of average particle size of 5-10 microns added in the same fashion; and a fourth cell similarly employed W of average particle size 5-10 microns as dopant. In each case 4g of dopant was used, ie the dopant amounted to slightly less than 4% by mass of the nickel powder used.

FIG. 1 is a schematic illustrative drawing in which a typical test cell in accordance with the invention is shown. This cell was assembled under an argon atmosphere, and is generally designated in the drawing by reference numeral 10. The cell comprises a beta"-alumina solid electrolyte 12 which separates and isolates a sodium anode 14 of the cell from a molten salt liquid electrolyte and cathode. The cathode, impregnated with electrolyte and surrounded by electrolyte, which electrolyte is in contact with the beta"-alumina solid electrolyte separator 12, is shown at 16. The anode 14 and cathode 16 are shown with suitable current collectors respectively designated 18 and 20, and the beta"-alumina separator 12 is arranged so that it forms a continuous barrier between the cathode/electrolyte 16 on the one hand, and the anode 14 on the other hand, within the cell housing 22.

Figure 2:
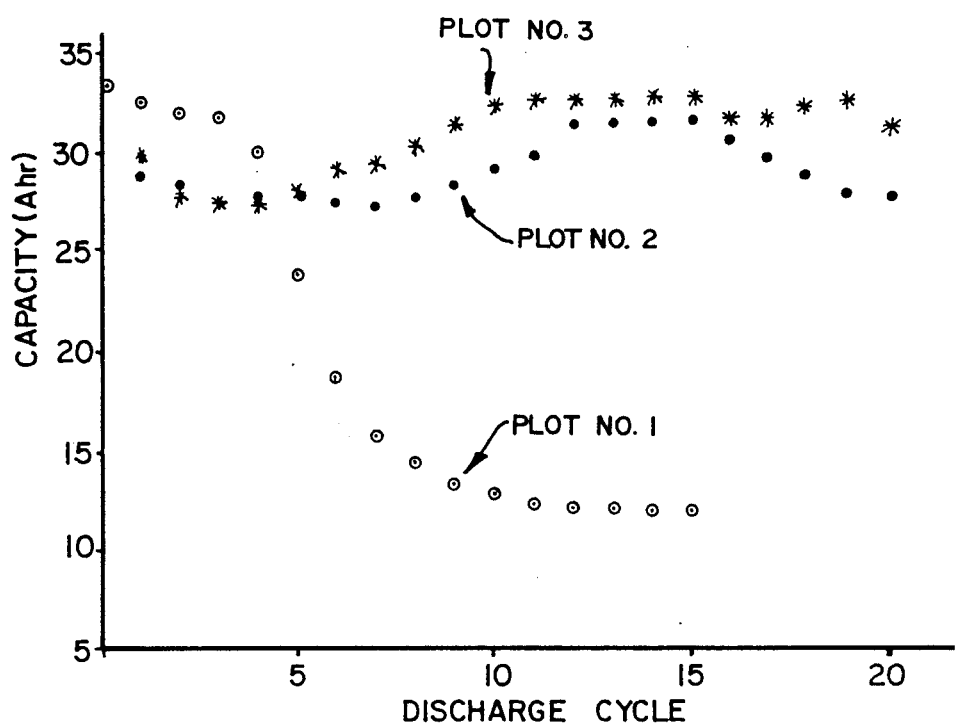

The control and the cells having Mo and W cathode dopants were heated to an operating temperature of 290°–300° C. and, after activation thereof by charging, were cycled by charging and discharging. During charging they were charged by a 2A current [equivalent to a current density at the separator of 10mA/cm$^2$] and they were discharged at 4A [20 mA/cm$^2$]. FIG. 2 shows a plot of cell capacity [Ahr] against number of cycles for the first 15 cycles for the control and for the first 20 cycles for the cells having Mo and W dopants respectively. In FIG. 2 the control is shown by plot No. 1, the cell with the Mo dopant being shown by plot No. 2 and the cell with the W dopant being shown by plot No. 3. Plot No. 1 shows that the control suffered a catastrophic loss of capacity after 15 cycles. In contrast plots Nos. 2 and 3 show that the Mo-doped and W-doped cathodes provided cells which retained about 90% of theoretical capacity [which theoretical capacity was 36,69 Ahr] after 20 cycles.

Figure 3:
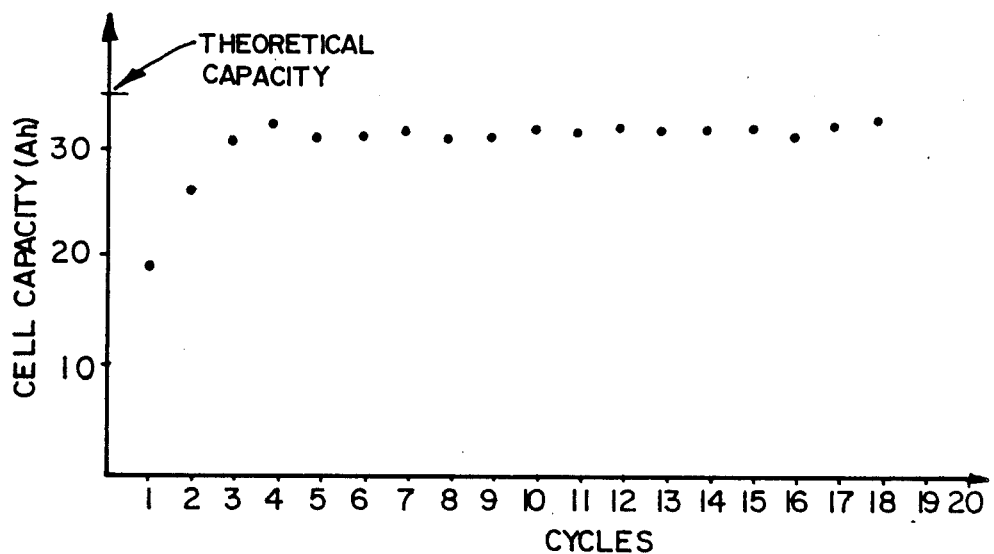
Figure 4:
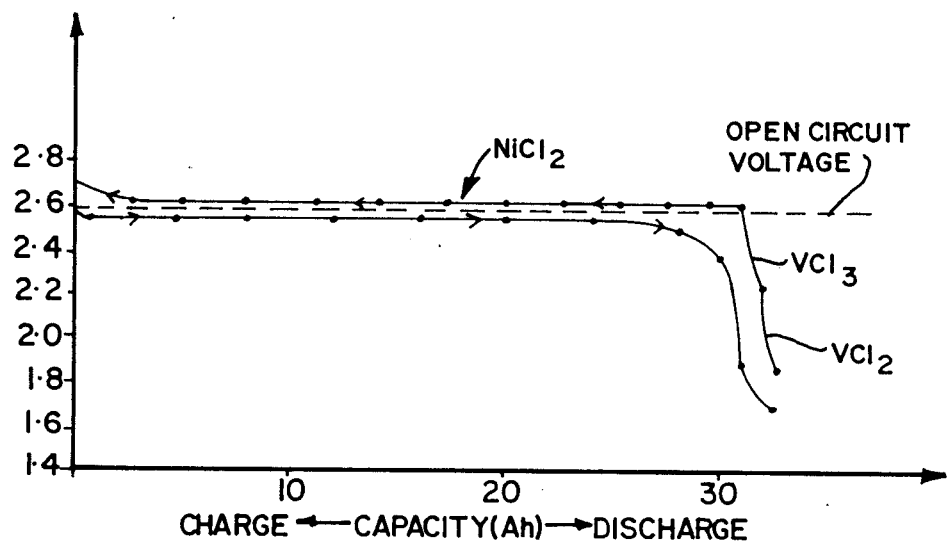

The cell whose cathode was doped with V was heated to an operating temperature of 280° C. and was cycled at 270–280° C. using a 1A charging current [5mA/cm$^2$]and a discharge current of 2A [10mA/cm$^2$]. FIG. 3 shows a plot of cell capacity in Ahr against number of cycles for 18 cycles, from which it appears that in this cell the cathode also retained about 90% of its theoretical capacity [36,69 Ahr] after 18 cycles. FIG. 4 shows the 18th charge/discharge cycle plot of cell voltage [V] against capacity [Ahr].

EXAMPLE 2

Figure 5:
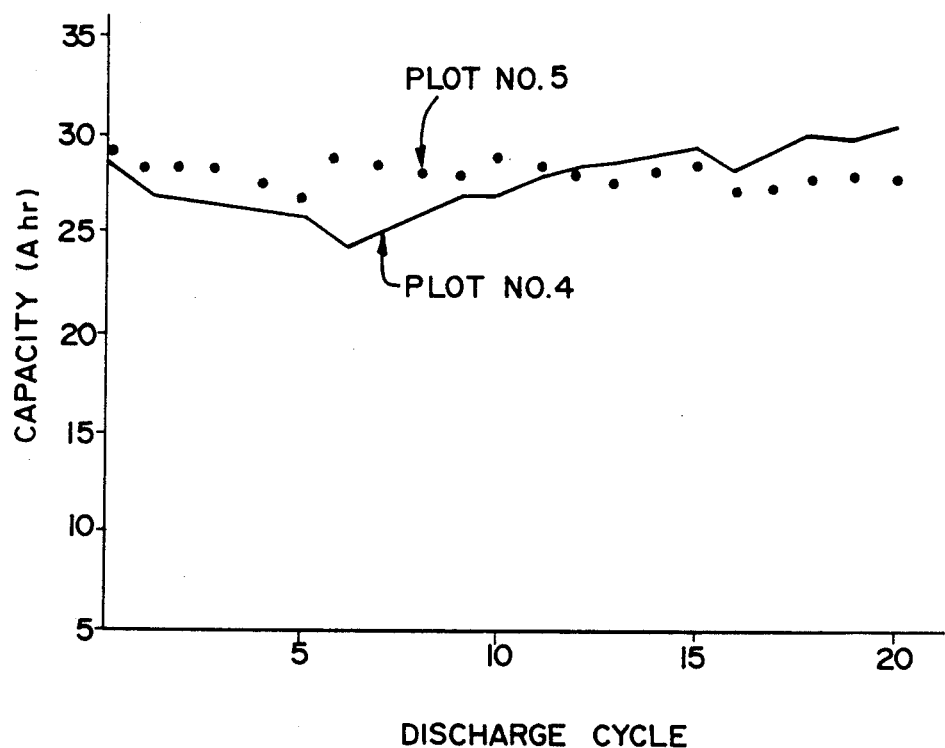

Example 1 was repeated using Pt and Pd as dopants in two test cells. FIG. 5 shows a plot similar to FIG. 2 for these test cells. Once again these test cells show very little, if any, loss of capacity with charge/discharge cycling after 20 cycles, Plot No. 4 being for Pt and Plot No. 5 being for Pd.

EXAMPLE 3

A production cell was made, using a tubular separator and cylindrical housing, but having its cathode prepared in the same fashion as in Example 1 and employing Mo as dopant. This cell was put through 20 charge/discharge cycles at essentially the same current densities at the separator during charge and discharge respectively as the cells in Example 1 (ie 10 mA/cm$^2$ during charging and 20 mA/cm$^2$ during discharging) at 290°–300° C.

Figure 6:
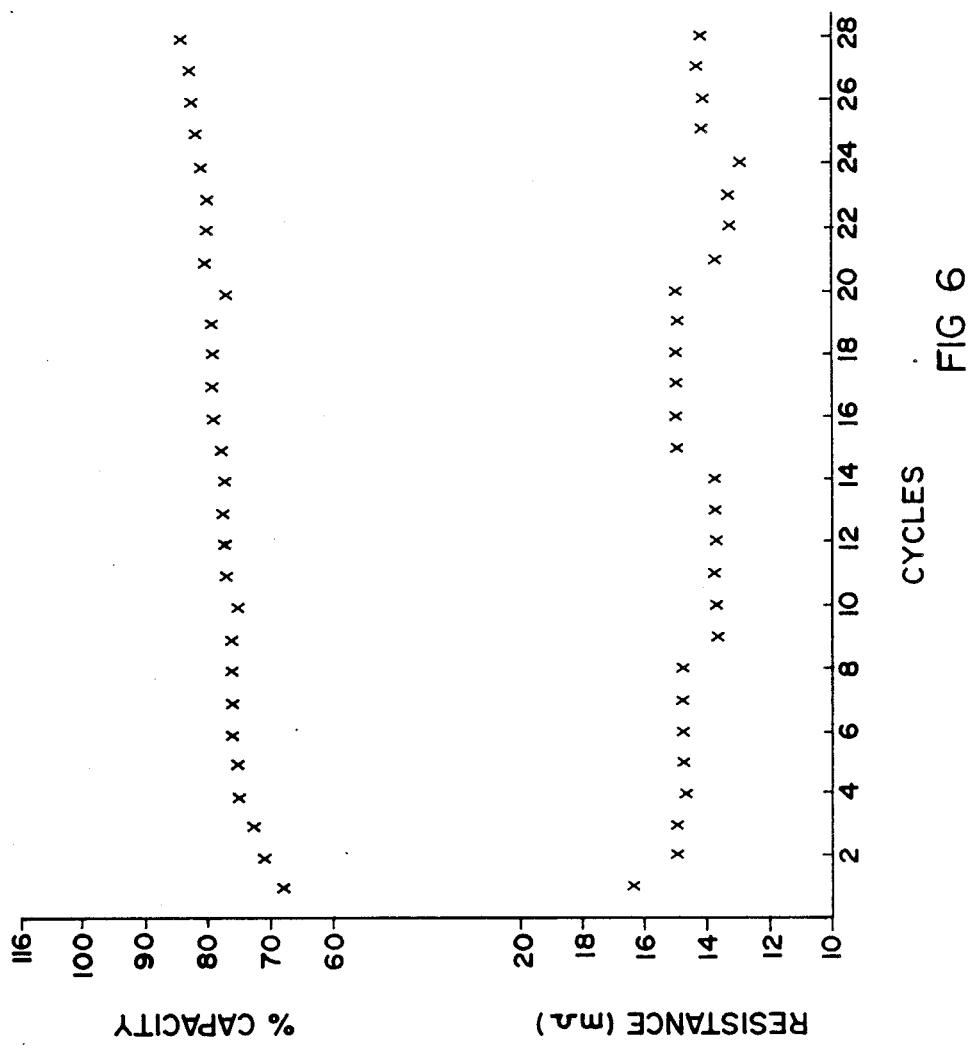

FIG. 6 is a plot of capacity (as a % of theoretical capacity) and internal resistance (mOhms) against number of cycles for the first 20 cycles. These plots show respectively a slight increase in capacity over said 20 cycles, and a substantially constant internal resistance, indicating that the dopant, while resisting a decrease in capacity caused by cycling, did not poison the separator or in any other way adversely affect internal resistance.

The Examples clearly demonstrate that use of the transition metal dopants in question radically resists the catastrophic drop in cathode capacity which takes place in the control. Without being bound by theory, the Applicant believes that the dopant acts by occupying potential crystal growth sites at grain or crystallite boundaries in the Ni/NiCl$_2$ active cathode substance, thereby resisting progressive crystallite growth, which growth is associated with the progressive drop in cathode capacity which the present invention seeks to combat.

In the aforegoing, the invention has been described with reference to the doping of a nickel-based cathode active substance with a minor proportion of a dopant which is a transition metal other than Fe, Cr, Co or Mn. From subsequent work conducted by the Applicant, the Applicant has reason to believe that when the active cathode substance is a chlorinated iron-containing, chromium-containing, cobalt-containing or manganese-containing substance, similar results can be obtained whereby the progressive drop in question of the capacity of the cathode with repeated charge/discharge cycling is resisted.

The invention accordingly extends to the cathode, cell and method described above, in which the cathode active substance is a chlorinated member of the group comprising iron-containing, chromium-containing, cobalt-containing and manganese-containing substances, and the dopant is a transition metal other than Fe, Ni, Cr, Co or Mn, the doping being carried out in substantially analogous fashion to the doping described above for nickel-based cathodes.

We claim:

1. A cathode for a high temperature rechargeable electrochemical cell which comprises an electronically conductive electrolyte-permeable macroscopically porous matrix impregnated with a sodium aluminum halide molten salt liquid electrolyte which contains chloride ions and is molten at the operating temperature of the cathode, the matrix having a chlorinated nickel-containing substance dispersed therein as its active cathode substance, a suitable transition metal other than Ni, Fe, Cr, Co or Mn being dispersed as a dopant in said active cathode substance, in a proportion of 0,1–10% by mass of the electrochemically active nickel in the cathode, for resisting a progressive drop in the capacity of the cathode with repeated charge/discharge cycling thereof.

2. A cathode as claimed in claim 1, in which any chloride of the dopant transition metal which forms during charging of the cathode has a eutectic with NaCl which has a melting point of at least 300° C.

3. A cathode as claimed in claim 1, in which the dopant is selected from the group of transition metals consisting of vanadium, molybdenum, tungsten, platinum and palladium, being present in a proportion of 1–5% by mass of said electronically active nickel.

4. A cathode as claimed in claim 1, in which the active cathode substance is selected from the group of chlorinated nickel-containing substances consisting of:
  NiCl$_2$;
  chlorides of alloys containing a major proportion of nickel on a molar basis alloyed with a minor molar proportion of at least one metal selected from the group consisting of iron, chromium, cobalt, manganese and mixtures thereof;
  intermediate refractory hard metal compounds of nickel and at least one non-metal selected from the group consisting of carbon, nitrogen, phosphorous, boron and silicon; and
  mixtures of at least two of the aforegoing.

5. A cathode as claimed in claim 4, in which the active cathode substance is NiCl$_2$, the matrix being nickel.

6. A high temperature rechargeable electrochemical cell which comprises a cathode as claimed claim 1, a sodium anode which is liquid at the operating temperature of the cell, a sodium aluminum halide molten salt liquid electrolyte in contact with the exterior of the cathode and having the same composition as the liquid electrolyte impregnated into the matrix of the cathode, and, between the anode and the electrolyte, and separating the anode from the electrolyte, a separator which is a solid electrolyte conductor of sodium ions or a micromolecular sieve which contains sodium sorbed therein.

7. In the manufacture of a cathode for a high temperature rechargeable electrochemical cell, the cathode comprising an electronically conductive electrolyte-permeable macroscopically porous matrix impregnated with a sodium aluminum halide molten salt liquid electrolyte which contains chloride ions and is molten at the operating temperature of the cathode, the matrix having a chlorinated nickel-containing substance dispersed therein as its active cathode substance, a method of rendering the cathode resistant to a progressive drop in the capacity thereof associated with repeated charge/discharge cycling thereof, the method comprising doping of the active cathode substance with a suitable transition metal dopant other than Fe, Cr, Co or Mn, so that the dopant is dispersed therein and is present in a proportion of 0,1–10% by mass of the electrochemically active nickel in the cathode.

8. A method as claimed in claim 7, in which the matrix is formed from a powder mix containing the active cathode substance or a precursor thereof in powder form, the method comprising dispersing the transition metal dopant or a suitable compound thereof in finely divided powder form having an average particle size of at most 10 microns in the powder mix prior to formation of the matrix, so that formation of the matrix from the powder mix results in a matrix in which the active cathode substance is dispersed, and in which the dopant is dispersed in the active cathode substance.

9. A method as claimed in claim 7, in which the liquid electrolyte is impregnated in the matrix after formation of the matrix, the dopant being dispersed in the active cathode substance by dispersing the dopant transition metal or a suitable compound thereof in finely divided powder form having an average particle size of at most 10 microns in the liquid electrolyte prior to impregnation of the electrolyte into the matrix, whereby the dopant transition metal becomes incorporated in dispersed form in the active cathode substance during subsequent charge/discharge cycling of the cathode.

10. A method as claimed in claim 8, in which the dopant powder is selected from the group consisting of said transition metal dopants in metallic form and the chlorides of said transition metal dopants.

11. A method as claimed in claim 8, in which the dopant powder is a compound selected from the sulphides, selenides and oxides of the transition metal dopants.

* * * * *